United States Patent [19]
Viduya

[11] Patent Number: 5,706,372
[45] Date of Patent: Jan. 6, 1998

[54] INTEGRATED OPTOELECTRONIC COMBUSTION PRESSURE SENSOR

[75] Inventor: Andres Deogracias Viduya, Carmel, Ind.

[73] Assignee: Delco Electronics Corporation, Kokomo, Ind.

[21] Appl. No.: 689,620

[22] Filed: Aug. 12, 1996

[51] Int. Cl.[6] .................... G02B 6/00; G01L 9/00
[52] U.S. Cl. .................... 385/12; 385/13; 73/705; 73/715; 250/227.14
[58] Field of Search ............... 385/12–13, 88–89, 385/92, 94; 73/705, 715, 716, 717; 250/227.11, 227.13, 227.14, 227.24, 227.31

[56] References Cited

U.S. PATENT DOCUMENTS

| | | |
|---|---|---|
| 4,703,174 | 10/1987 | Anderson et al. .................... 250/227 |
| 4,799,751 | 1/1989 | Tekippe .................... 385/12 |
| 5,127,269 | 7/1992 | Grudzien, Jr. .................... 73/705 |
| 5,365,789 | 11/1994 | Totterdell et al. .................... 73/705 |
| 5,385,053 | 1/1995 | Wlodarczyk et al. .................... 73/705 |
| 5,390,546 | 2/1995 | Wlodarczyk .................... 73/715 |

*Primary Examiner*—Rodney B. Bovernick
*Assistant Examiner*—Hemang Sanghavi
*Attorney, Agent, or Firm*—Mark A. Navarre

[57] ABSTRACT

A pressure port has a diaphragm at one end for exposure to combustion pressure, an electrical connector attached to the other end, terminal blades and a lead frame molded in the connector and carrying an optoelectronic circuit, and a fiber optic assembly between the circuit and the diaphragm. The fiber optic assembly illuminates the diaphragm which reflects light according to its deflection to two fiber elements that carry reflected light to the circuit. The assembly includes a high temperature plastic body and a ceramic tip for temperature isolation to protect the plastic body and the optoelectronic circuit.

5 Claims, 3 Drawing Sheets

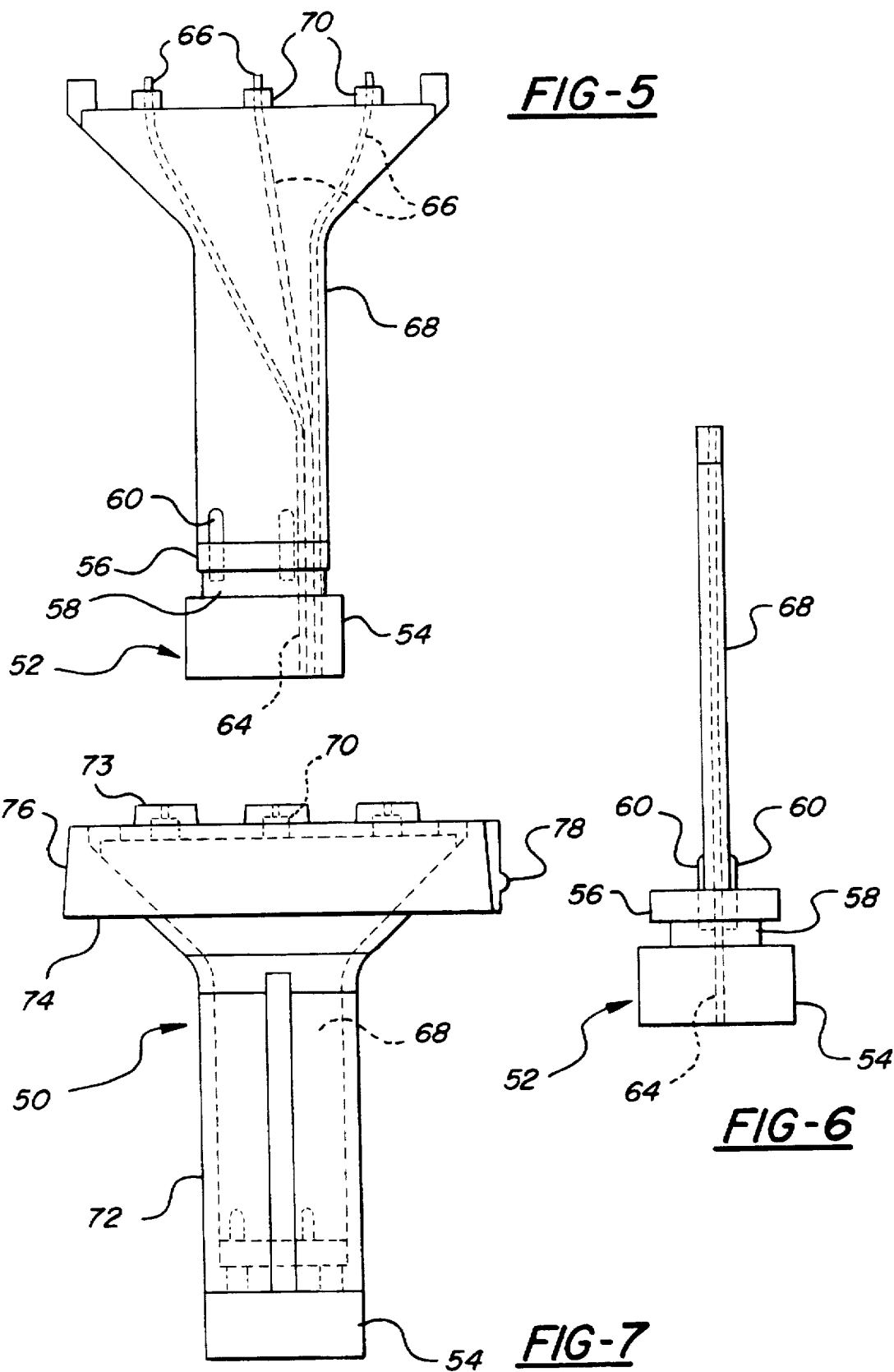

INTEGRATED OPTOELECTRONIC COMBUSTION PRESSURE SENSOR

FIELD OF THE INVENTION

This invention relates to pressure sensors and particularly to integrated sensors suitable to measure engine combustion pressure in high temperature environments.

BACKGROUND OF THE INVENTION

It is desired to employ combustion pressure measurements for control purposes in production engines. For that purpose a sensor should be relatively inexpensive, compact, and suitable for use on the engine itself, while affording accurate measurements. The sensor must be able to survive engine vibrations and perform correctly over a temperature range of −40° to 700° C.

It is already known to use fiber optics for pressure measurements as described in the U.S. Pat. No. 4,799,751 to Tekippe, entitled "DETECTION DEVICE USING FIBER OPTIC TECHNIQUES". There it is disclosed that the deflection of a diaphragm and therefore pressure on the diaphragm can be detected by illuminating a spot on the diaphragm by a fiber optic element, collecting reflected light with neighboring fiber optic elements, and determining the diaphragm deflection by detecting the relative amounts of light collected by the neighboring elements.

For the study of engine combustion pressures the usual laboratory practice has been to utilize a sensing head secured to the engine and coupled to remotely located measuring electronics by fiber optic cables. By using fiber optic cables at least one meter long the electronics can be isolated from the harsh environment of the engine compartment. While the operating principle of such equipment is sound, the measuring equipment is not manufacturable in high volumes and is very expensive.

SUMMARY OF THE INVENTION

It is therefore an object of the invention to package a combustion sensor including optoelectronic circuit with compensator electronics for use on an engine. Another object is to package such a sensor in a way that is readily manufacturable in high volumes and affordable for production engines.

A pressure sensor comprises a metal pressure port for threaded attachment to an engine head and a diaphragm is secured over the distal end of the port. An electrical connector having an insulating housing, terminal blades at one end, a recess at the other end and a lead frame in the recess is attached to the proximal end of the pressure port. A fiber optic assembly within the pressure port mates with the recess to form a sealed chamber and contains fiber optic elements which extend between the chamber and the diaphragm. An optoelectronic circuit is carried by the lead frame in the chamber and includes a compensation circuit, a LED for illuminating one of the fiber optic elements and a pair of photo diodes for receiving light from other fiber optic elements. The fiber optic assembly has a body comprising high temperature plastic and a ceramic tip adjacent the diaphragm to isolate the heat from the plastic.

BRIEF DESCRIPTION OF THE DRAWINGS

The above and other advantages of the invention will become more apparent from the following description taken in conjunction with the accompanying drawings wherein like references refer to like parts and wherein:

FIGS. 5 and 6 are front and side views of a fiber optic carrier and ceramic tip used in the pressure sensor; and FIG. 7 is an elevational view of a fiber optic assembly used in the pressure sensor.

DESCRIPTION OF THE INVENTION

Figure 1:
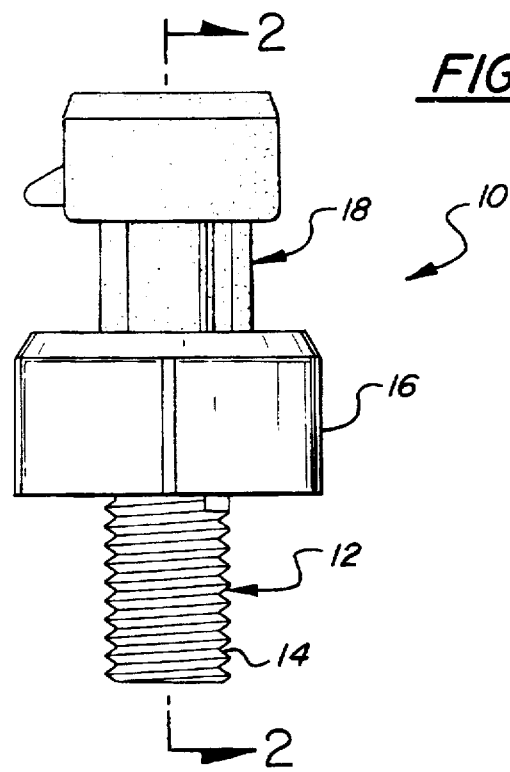
FIG. 1 is an elevational view of a pressure sensor according to the invention.
Figure 2:
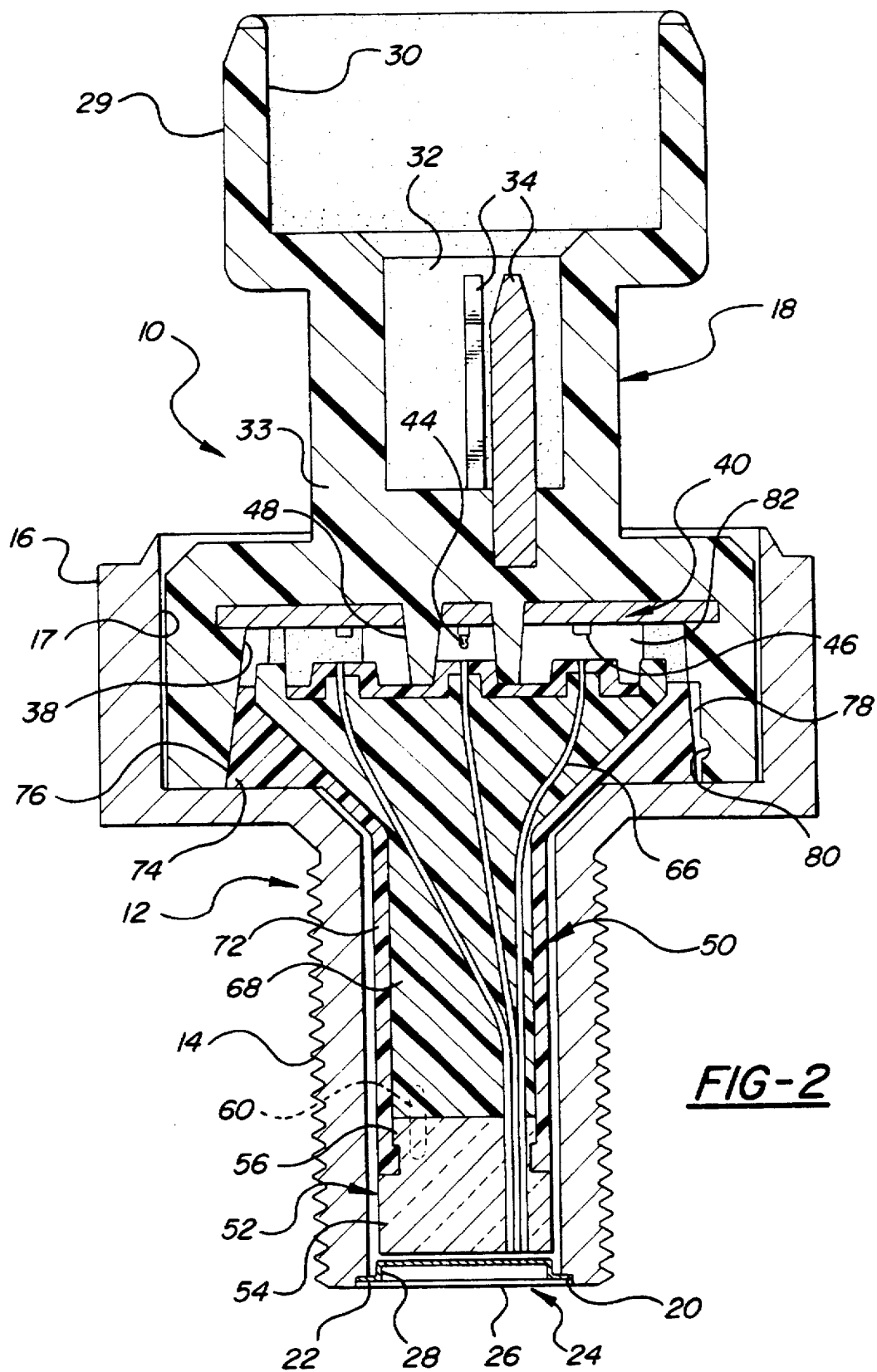
FIG. 2 is a cross section of the sensor of FIG. 1 taken along line 2—2.

Referring to FIGS. 1 and 2, a pressure sensor 10 has a hollow stainless steel pressure port 12 or casing with external threads 14 for fastening to a cylinder head, and a hex form 16 above the threads for receiving a wrench. The hex form has an inner cavity 17 which receives an electrical connector 18. The threaded end of the port 12 has a shallow counterbore 20 which receives a flange 22 of a hat-shaped diaphragm 24. The diaphragm is comprised of Inconel 718 and has a disk-shaped body 26 within the port 12 and connected to the flange by a cylindrical wall 28.

Figure 3:
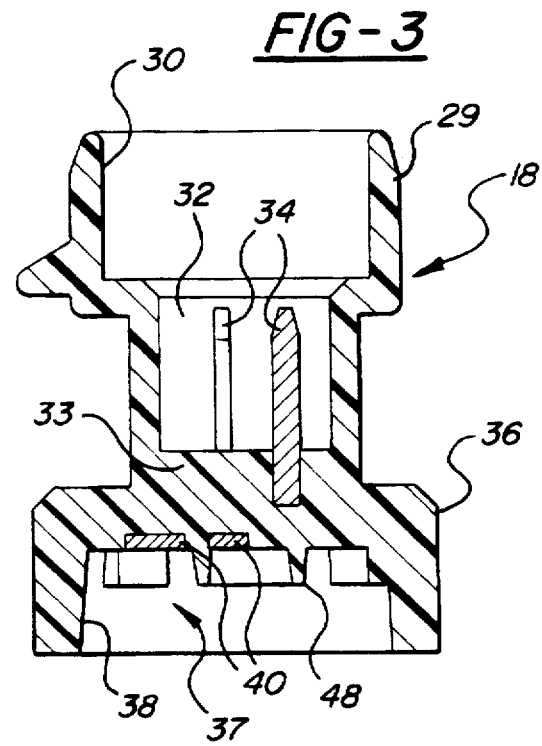
FIG. 3 is a cross section of a connector of the pressure sensor.

The electrical connector 18, further shown in FIG. 3, is a molding of insulating material with insert molded conductors. The connector has an enlarged upper end 29 formed with an outer large cavity 30 and an inner smaller cavity 32 terminating in a web 33 containing terminal blades 34 to define a receptacle for a standard automotive harness connector. The lower end of the connector 18 has an enlarged portion 36 which fits into the cavity 17 of the pressure port 12 and has an inner recess 37 bounded by the web 33 on the upper side and a frustoconical side wall 38.

Figure 4:
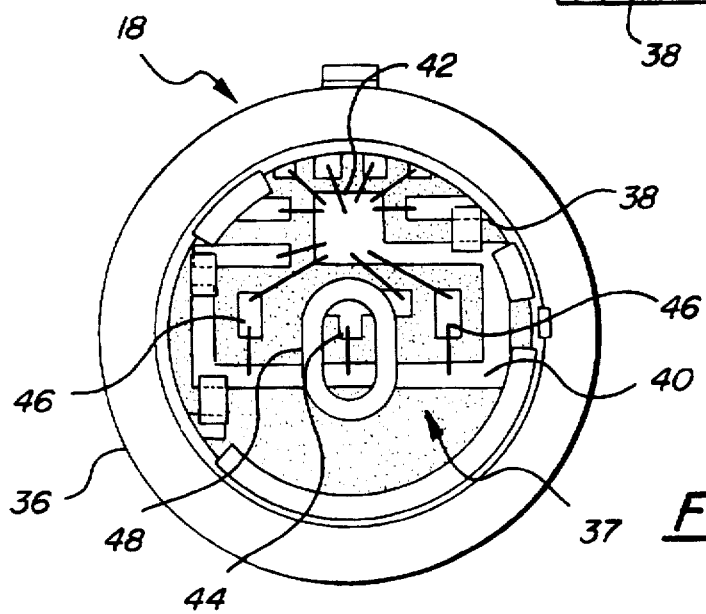
FIG. 4 is a bottom view of the connector of FIG. 3.

A lead frame 40 is molded into the web 33 along with the blades 34 to afford circuit pathways which are partially exposed at the recess 37 as can be seen in the bottom view of the connector in FIG. 4. Active circuit elements on the lead frame include a compensator IC 42 for temperature compensation and signal amplification, and optoelectronics including an LED 44 serving as a light source to illuminate the diaphragm and a pair of photodiodes 46 spaced on either side of the LED to receive light reflected from the diaphragm and produce a raw signal dependent on measured pressure. A shroud 48 which is a part of the connector 18 molding surrounds the LED to prevent stray light from reaching the photo-diodes.

A fiber optic assembly 50 contained within the pressure port 12 serves to couple light between the optoelectronic circuit and the diaphragm 26 and to perform the pressure sensor function. As shown in FIGS. 5, 6 and 7, the distal end of the assembly 50 adjacent the diaphragm comprises a ceramic tip 52 having a cylindrical body 54 and a reduced diameter attachment button 56 connected by a neck 58 to the body 54. A pair of guide pins 60 are supported by the button 56. A passage 64 near one side of the tip securely holds the ends of three fiber optic elements 66 adjacent one another. The fiber optic elements 66 are molded in a flat carrier 68 having a bottom end which engages the tip 52 and is positioned by the guide pins 60. Spaced bosses 70 on the top end of the carrier hold the center fiber optic element in alignment with the LED 44 and the two outer elements in alignment with the photo-diodes 46. The fiber optic elements protrude slightly above the bosses 70. The bottom end of the carrier is small to fit in the pressure port 12 but the top end of the carrier tapers outward to a larger dimension since it resides in the recess 37 of the connector and must span the optoelectronic circuit. A high temperature plastic envelope 72 is molded over the carrier and extends from the top of the ceramic body 54 to the top of the elements 66 and form bosses 73 around the bosses 70 of the carrier. The bottom of the envelope is locked into the space between the body 54 and the button 56 of the ceramic tip 52 to unitize the fiber optic assembly 50. The top of the envelope has an enlarged head 74 with a frustoconical wall 76 which tightly mates with the wall 38 of the connector. An index tab 78 extending from the wall 76 registers with an index notch 80 in the connector to assure correct alignment. As best shown in FIG. 2, the head seats in the recess 37 such that it is spaced from the lead frame 40 and associated circuit members, thereby defining a sealed chamber 82 containing the circuitry.

The ceramic tip 52 is used to isolate the plastic and electronic portions of the sensor from the high combustion temperatures at the diaphragm 26. Due to a large thermal gradient in the ceramic body 54, the bottom of the body 54 adjacent the diaphragm may reach 700° C. but the temperature at the plastic envelope abutting the top of the body will reach only 250° C. The optoelectronic circuit, being further removed from the tip 52 will experience even lower temperatures. The fiber optic elements 66 may be either glass or plastic composition.

In operation, the sensor is installed in an engine cylinder head so that the diaphragm will flex according to the pressure at the cylinder. The center fiber optic element carries light from the LED 44 to a spot on the diaphragm and reflected light will be collected by the other two elements 66 in amounts which depend on the diaphragm deflection, according to the principles described in the above mentioned U.S. Pat. No. 4,799,751. The photo-diodes 46 sense the reflected light and the resulting signals are processed by the compensation chip to produce an output on the terminals of the connector.

The sensor package as described herein is readily manufactured at relatively low cost. The package is small, say, less than 2 inches in height, and performs all the functions formerly carried out by expensive laboratory equipment with long fiber optic cables and remote electronics. By using the ceramic tip to isolate high temperatures the optoelectronic elements are safely contained even though the package is small.

The embodiments of the invention in which an exclusive property or privilege is claimed are defined as follows:

1. An optoelectronic combustion pressure sensor of the type which optically measures diaphragm deflection comprising:

a hollow metal casing having a first end for exposure to the pressure being measured and a second end;

a diaphragm secured to the first end and subject to deflection according to pressure;

an electrical connector attached to the second end, the connector comprising an insulating housing and inner conductors;

the housing having a recess adjacent the second end;

an optoelectronic circuit in the recess mounted on the inner conductors; and a fiber optic assembly seated in the recess adjacent the circuit and extending through the casing for coupling light between the optoelectronic circuit and the diaphragm.

2. The invention as defined in claim 1 wherein the fiber optic assembly comprises:

a plurality of fiber optic elements;

a carrier for supporting the fiber optic elements;

a ceramic tip adjacent the diaphragm having a passage including ends of the fiber optic elements; and a high temperature plastic molding uniting the tip and carrier.

3. The invention as defined in claim 1 wherein the fiber optic assembly includes a ceramic tip adjacent the diaphragm for protecting the assembly from high temperatures.

4. The invention as defined in claim 1 wherein:

the optoelectronic circuit includes a light source and a plurality of light detectors spaced from the light source; and the fiber optic assembly includes fiber optic elements having first ends aligned with the light source and the light detectors respectively, and second ends held together adjacent the diaphragm for illuminating the diaphragm and collecting light reflected from the diaphragm.

5. The invention as defined in claim 1 wherein:

the recess in the housing being bounded by a frustoconical side wall;

the fiber optic assembly having an outer side wall mating with and tightly seated against the frustoconical side wall to define a sealed chamber between an end of the assembly and the housing; and the circuit residing in the sealed chamber.

* * * * *